(12) United States Patent
Hadi et al.

(10) Patent No.: US 10,569,613 B2
(45) Date of Patent: Feb. 25, 2020

(54) METHOD OF ALERTING DRIVER TO CONDITION OF SUSPENSION SYSTEM

(71) Applicant: Tenneco Automotive Operating Company Inc., Lake Forest, IL (US)

(72) Inventors: Rod Hadi, Walled Lake, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 153 days.

(21) Appl. No.: 15/716,671

(22) Filed: Sep. 27, 2017

(65) Prior Publication Data
US 2018/0093543 A1   Apr. 5, 2018

Related U.S. Application Data

(60) Provisional application No. 62/403,256, filed on Oct. 3, 2016.

(51) Int. Cl.
  *B60G 17/0185* (2006.01)
  *B60G 17/0165* (2006.01)
  *G07C 5/08* (2006.01)

(52) U.S. Cl.
  CPC ..... *B60G 17/0185* (2013.01); *B60G 17/0165* (2013.01); *B60G 2401/142* (2013.01); *B60G 2600/084* (2013.01); *B60G 2800/80* (2013.01); *G07C 5/0825* (2013.01)

(58) Field of Classification Search
  CPC ............ B60G 17/0165; B60G 17/0185; B60G 2401/142; B60G 2600/084; B60G 2800/80; G07C 5/0825
  See application file for complete search history.

(56) References Cited

U.S. PATENT DOCUMENTS

| | | | | |
|---|---|---|---|---|
| 4,854,409 | A | * 8/1989 | Hillebrand | ........... B62D 61/125 180/24.02 |
| 5,269,186 | A | * 12/1993 | Yopp | ....................... G01M 1/28 73/457 |
| 8,930,229 | B2 | 1/2015 | Bowne et al. | |
| 9,256,991 | B2 | 2/2016 | Crawford | |
| 9,483,884 | B2 | 11/2016 | Chen et al. | |
| 9,605,970 | B1 | 3/2017 | Day et al. | |
| 9,989,456 | B2 * | 6/2018 | Retterath | ......... G08G 1/096758 |

(Continued)

FOREIGN PATENT DOCUMENTS

DE   102015205596 A1   9/2016

OTHER PUBLICATIONS

Attest Soft Car Diagnostics Shock Test App.

*Primary Examiner* — Mussa A Shaawat
(74) *Attorney, Agent, or Firm* — Harness, Dickey & Pierce, P.L.C.

(57) ABSTRACT

An electronic device and a method for determining whether a vehicle suspension system has degraded by positioning the electronic device in a vehicle includes activating a camera to initiate data capture within the electronic device. The camera is positioned to capture a change in a field of view during vehicle operation. The method includes calculating a vehicle suspension operating characteristic based on information captured by the camera and determining whether the calculated vehicle suspension operating characteristic exceeds a threshold. A signal indicative of suspension degradation is output when the threshold is exceeded.

11 Claims, 3 Drawing Sheets

(56) References Cited

U.S. PATENT DOCUMENTS

Figure 1:
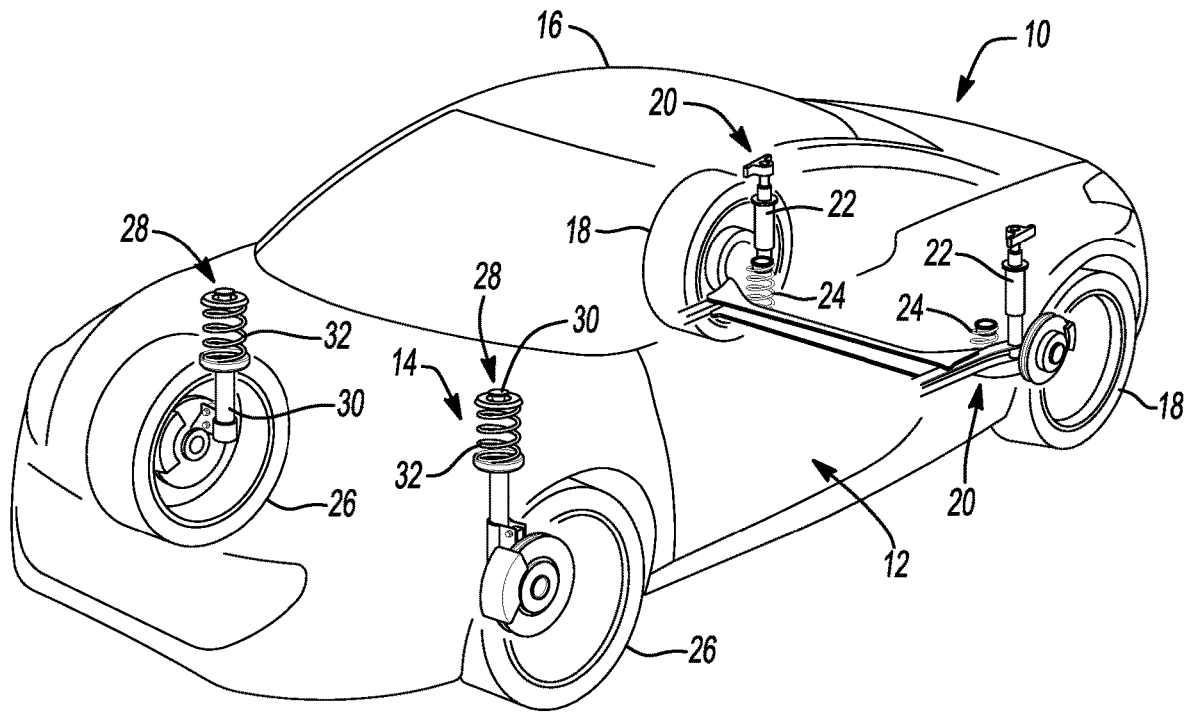

| | | | |
|---|---|---|---|
| 2002/0116992 A1* | 8/2002 | Rickel | B60C 11/24 73/146 |
| 2003/0006893 A1* | 1/2003 | Dunbridge | G01M 17/02 340/444 |
| 2006/0116799 A1* | 6/2006 | Mahlo | B60G 17/0185 701/31.4 |
| 2007/0067080 A1* | 3/2007 | Messih | B60R 21/0132 701/37 |
| 2009/0309710 A1* | 12/2009 | Kakinami | B60Q 9/004 340/435 |
| 2010/0110194 A1* | 5/2010 | Euler | B60R 1/00 348/149 |
| 2011/0043689 A1* | 2/2011 | Cobb | G06K 9/00765 348/453 |
| 2013/0103259 A1 | 4/2013 | Eng et al. | |
| 2013/0278771 A1* | 10/2013 | Magoun | H04N 5/33 348/148 |
| 2013/0314503 A1 | 11/2013 | Nix et al. | |
| 2014/0195112 A1 | 7/2014 | Lu et al. | |
| 2014/0350836 A1* | 11/2014 | Stettner | G01S 17/023 701/301 |
| 2015/0087257 A1* | 3/2015 | Balram | H04W 4/12 455/404.1 |
| 2015/0254955 A1* | 9/2015 | Fields | G08B 21/02 705/4 |
| 2015/0308925 A1 | 10/2015 | Cheung et al. | |
| 2015/0344032 A1 | 12/2015 | Oh et al. | |
| 2016/0140748 A1* | 5/2016 | Cline | G06T 13/80 345/475 |
| 2016/0144682 A1 | 5/2016 | Lachica | |
| 2016/0339757 A1* | 11/2016 | Gussen | B60G 17/0185 |
| 2017/0032592 A1* | 2/2017 | Lu | G07C 5/0808 |
| 2017/0106855 A1* | 4/2017 | Lavoie | B60W 10/184 |
| 2017/0195605 A1* | 7/2017 | Alves | G06K 9/4661 |
| 2018/0003593 A1* | 1/2018 | Siegel | B60C 11/246 |
| 2018/0038705 A1* | 2/2018 | Bills | G01C 21/3484 |

* cited by examiner

METHOD OF ALERTING DRIVER TO CONDITION OF SUSPENSION SYSTEM

CROSS-REFERENCE TO RELATED APPLICATIONS

This application claims the benefit of U.S. Provisional Application No. 62/403,256, filed on Oct. 3, 2016. The entire disclosure of the above application is incorporated herein by reference.

FIELD

The present disclosure relates generally to computer programming and more particularly to systems and methods for identifying vehicle suspension system degradation.

BACKGROUND

This section provides background information related to the present disclosure which is not necessarily prior art.

Nearly every vehicle traveling over the ground includes a suspension system for filtering or isolating the vehicle's body "unsprung portion" from the vehicle's wheels and axles "unsprung portion" as the vehicle travels over road surface irregularities as well as to control body and wheel motion. Suspension systems are also used to maintain a desired vehicle attitude to promote improved stability of the vehicle during maneuvering.

As with any mechanical system, components may wear and the performance of the vehicle suspension system may degrade over time. Typically, the degradation in performance to the vehicle's suspension system occurs slowly over time and the change in system operation is not noticed by the vehicle operator. Unfortunately, depending on the magnitude of suspension system degradation, a decrease in vehicle control, safety and ride comfort may occur. In some instances, the vehicle occupants' spinal system may be negatively affected.

Accordingly, a need exists for a simple and cost effective system to monitor, detect and alert a vehicle operator of the vehicle suspension system operating status.

SUMMARY

This section provides a general summary of the disclosure, and is not a comprehensive disclosure of its full scope or all of its features.

An electronic device and a method for determining whether a vehicle suspension system has degraded by positioning the electronic device in a vehicle includes activating a camera to initiate data capture within the electronic device. The camera is positioned to capture a change in a field of view during vehicle operation. The method includes calculating a vehicle suspension operating characteristic based on information captured by the camera and determining whether the calculated vehicle suspension operating characteristic exceeds a threshold. A signal indicative of suspension degradation is output when the threshold is exceeded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
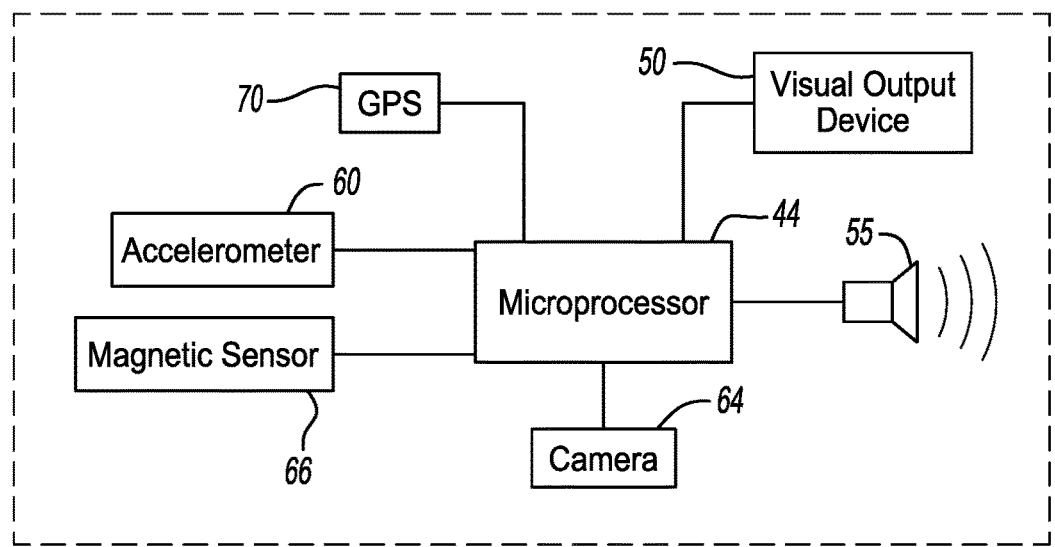
Figure 3:
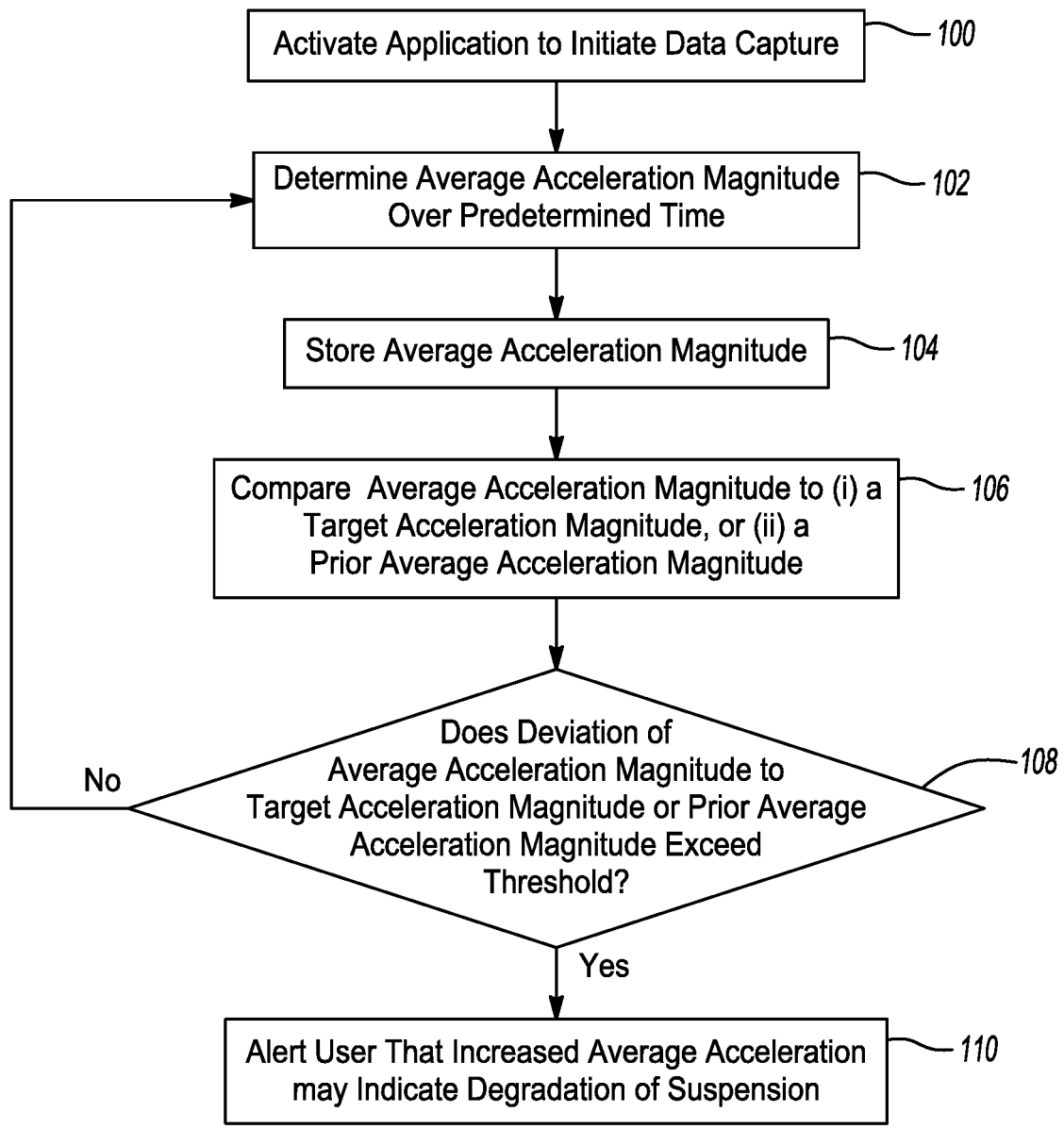
Figure 4:
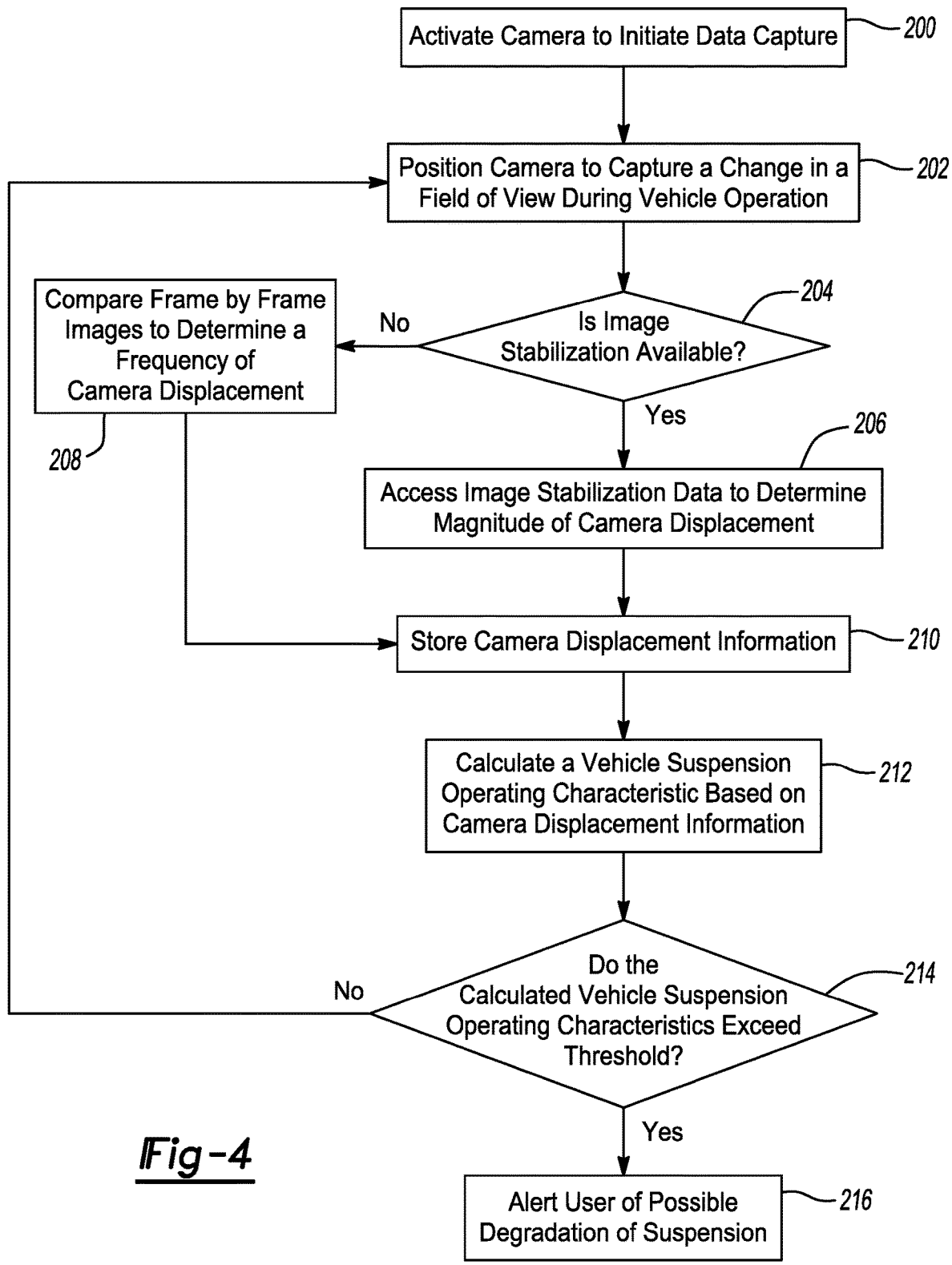

FIG. 1 is a diagrammatic illustration of a vehicle incorporating the suspension system evaluation system in accordance with the teachings of the present disclosure;

FIG. 2 flow diagram depicting a portable electronic device configured with a suspension evaluation system on the present disclosure;

FIG. 3 is a flow chart depicting a process performed by the suspension evaluation system; and FIG. 4 is a flow chart depicting a process performed by the suspension evaluation system.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application or uses. There is shown in FIG. 1 a vehicle 10 incorporating an exemplary suspension system. Vehicle 10 comprises a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of corner assemblies 20. Each corner assembly 20 includes a shock absorber 22 and a helical coil spring 24. Similarly front suspension 14 includes a transversely extending front axle assembly (not shown) to operatively support the vehicle's front wheels 26. The front axle assembly is operatively connected to body 16 by means of a second pair of corner assemblies 28. Each corner assembly 28 includes a shock absorber 30 and a helical coil spring 32. Shock absorbers 22 and 30 serve to dampen the relative motion of the unsprung portion (i.e. front and rear suspensions 12 and 14, respectively) and the sprung portion (i.e. body 16) of vehicle 10.

While vehicle 10 has been depicted as a passenger car having front and rear axle assemblies, shock absorbers 22 and 30 may be used with other types of vehicles and/or in other types of applications such as vehicles incorporating independent front and/or independent rear suspension systems. Further, the term "shock absorber" as used herein is meant to include dampers in general and thus will include struts. Also, while front suspension 14 is illustrated having a pair of struts or shock absorbers 30, it is within the scope of the present disclosure to have rear suspension 12 incorporate a pair of struts or shock absorbers 30 if desired.

Over time and through the use of vehicle 10, the various components of corner assemblies 20 may wear, fatigue, or become damaged. Changes in the condition of the components may degrade the performance of front suspension 14, rear suspension 12 or both. The present disclosure utilizes a smart phone or other portable electronic device 40 positioned on or otherwise within vehicle 10. Electronic device 40 is programmed with or is in electronic communication with a suspension evaluation system operable to monitor and determine the ongoing performance of the vehicle suspension.

FIG. 2 illustrates a block diagram of portable electronic device 40 including the suspension evaluation system constructed in accordance with the teachings of the present disclosure. Portable electronic device 40 is controlled by a microprocessor 44, which processes instructions and sends information to a visual output device 50, such as a monitor or other mechanism for displaying visual information to a user, and an audio output device 55, such as a speaker. Portable electronic device 40 also includes an accelerometer 60 operable to output a signal or signals indicative of acceleration experienced by the portable electronic device 40. Accelerometer 60 may include any number of mechanisms for detecting acceleration and may be configured to output signals corresponding to accelerations along different axes. In particular, accelerometer 60 may include a 3-axis accelerometer. Portable electronic device 40 also includes a camera 64 and an integrated magnetic sensor 66.

In one arrangement, portable electronic device 40 includes a global positioning system (GPS) 70 operable to output a signal indicative of the present position of portable electronic device 40. Microprocessor 44 may capture data from accelerometer 60 after a minimum vehicle speed has been reached. Microprocessor 44 utilizes the signal from GPS 70 to make this determination. Once the vehicle speed drops below a predetermined threshold for a predetermined amount of time, data capture from accelerometer 60 will occur. For example, a minimum speed may include ten miles per hour. The period of time in which data capture continues when the vehicle speed is below the predetermined threshold may be one minute.

It should be appreciated that accelerometer 60 need not be physically housed within portable electronic device 40. Alternatively, acceleration sensors may be fixed to vehicle 10 and operable to transmit signals to portable electronic device 40 indicative of the acceleration sensed by the onboard acceleration sensors.

Microprocessor 44 may collect additional data provided from sensors positioned within portable electronic device 40 or positioned in other locations within vehicle 10. For example, other measured parameters may include air temperature, relative humidity, noise, and frequency and duration of vehicle movement.

Microprocessor 44 is also alternatively operable to capture additional information including vehicle speed, road condition, body acceleration signals, braking information, cabin or external temperature, and GPS position to perform additional computations and provide information to the user of portable electronic device 40.

Once data has been collected, a number of calculations may be made to determine whether vehicle suspension operation has degraded. For instance, an approximation of the acceleration data may be computed as average acceleration per time. Accelerations may also be catalogued as a function of vehicle speed. Acceleration data may be manipulated using a number of different statistical methods. For example, data may be gathered over a particular time interval and an average acceleration per unit of time may be computed. The average acceleration per unit of time may be updated at any desired time interval. In at least one arrangement, this information is stored locally within the memory of portable electronic device 40. In an alternate arrangement, the information may be transferred and stored on a remote device.

It may be advantageous to implement a process for determining vehicle suspension degradation as presented in the flow diagram of FIG. 3. At block 100, the application is activated to initiate data capture. At block 102, microprocessor 44 computes an average acceleration magnitude for a predetermined amount of time. The average acceleration magnitude is stored in block 104. At block 106, the average acceleration magnitude is compared to a predetermined target acceleration magnitude or a prior average acceleration magnitude. At decision block 108, microprocessor 44 determines whether a deviation between the average acceleration magnitude and the predetermined target acceleration or the prior average acceleration magnitude exceeds a threshold. If not, data collection and calculations continue. If so, the process continues at block 110 where the user receives an alert that a suspension may have degraded. The alert may include a visual output via visual output device 50 and/or an audible signal output via speaker 55.

The calculations to determine whether suspension degradation has incurred may include utilizing root-mean-square "RMS" methods. Data may be RMS averaged over a period of time such as 24 hours and stored into memory. The acceleration data for the entire 24 hour period may be reduced to a single or a few data points to minimize the amount of internal memory required by the application. Microprocessor 44 may provide a signal indicating suspension degradation may have occurred if the average acceleration magnitude continues to increase over a period of time, such as a month, or the average magnitude of the measured accelerations over a predetermined period exceeds a predetermined threshold. For example, accelerations exceeding 1.0 meter per second squared RMS may be determined as detrimental to vehicle occupants.

Microprocessor 44 may also be operable to access information from the internet or other applications to inform the suspension evaluation system. For example information regarding nearby vehicle service stations or retailers of certified service components may be provided via visual output device 50. A map may be provided to the user indicating the location of the service station or part retail store. Financial incentives such as coupons or discounts from certain participating installers or service stations may be provided to the user.

Other information may be provided to the user of portable electronic device 40, including but not limited to, advice for minimizing damage and/or wear to the vehicle suspension components. A list of preferred travel routes or routes to avoid may be provided to the user to minimize suspension degradation.

Beneficially, microprocessor 44 may store or at least associate acceleration information as a function of vehicle location or route traveled. This information may be stored locally or in a remote repository to create a database of routes that may be subsequently characterized as preferred routes or routes to avoid to maximize the life and performance of the vehicle suspension components.

Portable electronic device 40 may be in communication with other vehicle systems via a wireless protocol such as Bluetooth. Data acquired by the vehicle sensors may be provided to microprocessor 44 to change or control the modes or status of the suspension system or other components or systems in the vehicle, such as engine mounts or to further assist with the determination of possible vehicle suspension degradation.

In yet another operating mode, microprocessor 44 may provide a vehicle operator instructions via speaker 55 or visual output device 50 to conduct one or more tests to assess vehicle suspension performance. For example, one suspension evaluation test may instruct the driver to park the vehicle and manually apply a load to different portions of the vehicle such as the front or rear bumper at corners of the vehicle while the suspension evaluation system is activated. In another example, the suspension evaluation test may instruct the driver to place one or more wheels on a curb (or other standardized height component) and instruct the driver to back off the curb while the suspension evaluation system is activated. Signals from accelerometer 60 will be provided to microprocessor 44 during various portions of test. Results of the test will be compared to either data previously collected and associated with previously collected data, a properly functioning suspension system or theoretical acceleration responses to determine whether the vehicle operator should receive advice regarding possible suspension system degradation. As such, the evaluation is able to identify a suspension system degradation at a specific corner, or all four corners as a whole. As another option, data representing the vehicle location and acceleration magnitude may be automatically, or after user confirmation, communicated wirelessly to a central server as a report of the road condition. This data may be analyzed to estimate road conditions such as a size of a pothole. Depending on the severity of the event, a signal may be sent requesting priority scheduling of a road or bridge repair.

It should be appreciated that while certain combinations of sensors and data collection methods have been described, other combinations of utilizing this data should be considered as within the scope of the present disclosure. This includes an analysis of all four corners together, each corner separately, or any combination thereof.

The present disclosure also relates to a method of capturing vehicle data using existing integrated camera 64 (FIG. 2) in portable electronic device 40, using the data to determine the state of a vehicle subsystem, and providing an alert to a user relating to the state of the vehicle subsystem. In one embodiment, the method relates to providing instruction on how to position the portable electronic device in the vehicle, on for example the rigid dashboard, and using integrated camera 64 to detect and measure vibration data of a vehicle over time, storing the data, or some statistical approximation of the data within the memory of portable electronic device 40, using the data to determine the state of the vehicle's suspension system, and providing an alert if the state of the vehicle's suspension system either (1) degrades over a predetermined time period, or (2) is in otherwise a poor condition.

Portable electronic device 40 may be equipped with an active image stabilization (IS) system which is used to reduce the effect of frame to frame jitter caused by camera shake. When equipped with active IS, a mechanism is provided within the portable electronic device 40 that 1) moves the camera image sensor to compensate for the camera shake or 2) moves a floating lenses to compensate for image shake. While the capability of such stabilization measures are limited (good for walking for example), such techniques are not good for large shaking/displacements. While it is possible to adjust the camera to higher shutter speeds to compensate for larger displacements, there remains a limit to the magnitude of available compensation.

The improved method of collecting vehicle suspension data involves gaining access to the data driving the portable electronic device's active IS. By monitoring the time history of the active IS commands to the IS mechanism, a magnitude of camera shake/displacement can be used as an input to the calculation of the performance of the suspensions system.

This method is further improved by placing portable electronic device 40 in a position and orientation where there is a sharp contrast between light and dark features within the view of the camera lens. For example, with portable electronic devices having only one of two cameras having active IS, portable electronic device 40 is placed at a location where a portion of the image is the light background of the sky and another portion is the dark foreground image of the car interior. By way of another example, placing the camera facing at a portion of the interior of the vehicle that is all a similar texture/color will make it difficult for the camera to focus even when vehicle is stationary.

In another embodiment, portable electronic device 40 is not equipped with an active IS, but is instead integrated with passive digital IS software that reduces the effect of frame to frame jitter caused by camera shake. When equipped with passive software based IS, a filter or other pixel by pixel frame by frame analysis is performed. When a shift it detected in location of the pixels, the software then performs a pixel shift in order to bring adjacent frames into alignment.

An improved method of collecting vehicle suspension data involves gaining access to the same portable electronic device algorithms driving the portable electronic device's passive IS. By monitoring the time history of the passive IS commands to the pixel shifting commands, a magnitude of camera shake/displacement can be used as an input to the calculation of the performance of the suspensions system.

The method is further improved by for example placing portable electronic device 40 face down onto a surface of the car such that the camera focus is not a variable. The camera will detect a dark screen and drive a command to powering off the screen. By monitoring the frequency of power off, or using the images captured by the camera to do a pixel by pixel mapping of the dark screen (camera blocked) vs light screen (camera has raised up off the surface of vehicle that was previously blocking the light), such frame by frame comparisons can be used as an input to the calculation of the performance of the suspensions system. This method is further improved by facing portable electronic device 40 up and positioning an engineered tuner over the camera so that a finer resolution of data can be detected. This removes the mass of portable electronic device 40 as a variable.

FIG. 4 provides a flow diagram pertaining to a process for determining vehicle suspension degradation. At block 200, a camera 64 (FIG. 2) is activated to initiate data capture. At block 202, camera 64 is positioned to capture a change in a field of view of the camera during vehicle operation. Block 204 questions whether image stabilization data is available. If so, block 206 accesses the image stabilization data to determine a magnitude of camera displacement. If image stabilization data is not available, control continues to block 208 where a frame-by-frame comparison of images captured by the camera is made to determine a frequency of camera displacement. At block 210, camera displacement information is stored. At block 212, a vehicle suspension operating characteristic is calculated based on the camera displacement information. At decision block 214, microprocessor 44 determines whether the determined vehicle suspension operating characteristic exceeds a threshold. If not, data collection and calculation is continued. If so, the process proceeds to block 216 where the user receives an alert of possible degradation of suspension. The alert may be a visual output via visual output device 50 and/or an audible signal output via speaker 55.

It should be appreciated that a process very similar to the one depicted in FIG. 4 may be utilized in conjunction with portable electronic device 40 being equipped with an integrated magnetic sensor 66 (FIG. 2).

In this arrangement, the portable electronic device camera 64 is not used, but instead portable electronic device 40 has an integrated magnetic sensor 66 (FIG. 2) specifically for monitoring if a screen cover is open or closed. This technology uses an onboard magnetic sensor in the portable electronic device that identifies when a portable electronic device cover with integrated metallic element comes into proximity. In normal operation, like the previous optical detection, the proximity detection will drive a command to shut off power to the screen. By monitoring this proximity sensor, the time history data can be used as an input to the calculation of the performance of the suspensions system. This method is further improved by placing a engineered metallic tuner in proximity to the magnetic sensor so that a finer resolution of data can be detected (Removes mass of the cover as a variable).

In another embodiment, a vehicle-equipped camera is utilized. While back up cameras have become standard equipment, more vehicles are integrating cameras for forward park assist, occupant detection, integrated headliner phones, and enablement of autonomous driving. Each of these cameras has the ability to use active or passive image stabilization (video or still) to detect performance of the vehicle suspension system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic device comprising:
a processor;
a camera operable to capture a change in a field of view during operation of a vehicle, wherein the field of view is defined to include a first portion of an image in the field of view exhibiting a lighter background than a second portion of the image in the field of view to provide a sharp contrast between the first and second portions of the image; and
a suspension evaluation system operable to determine whether a degradation of suspension system performance has occurred based at least partly on the change in the field of view of the camera, wherein the processor is operable to determine a vehicle suspension operating characteristic based on information captured by the camera, wherein the processor is operable to compare the vehicle suspension operating characteristic to a threshold and output a signal indicative of suspension system degradation when the threshold is exceeded.

2. The electronic device of claim 1, wherein the electronic device is equipped with an image stabilization system and the microprocessor accesses data collected by the image stabilization system to determine the magnitude of camera displacement.

3. The electronic device of claim 2, wherein the microprocessor stores camera displacement information.

4. The electronic device of claim 3, wherein the microprocessor is operable to compare images captured by the camera at different times and compares the images to determine a frequency of camera displacement.

5. The electronic device of claim 1, wherein the first portion of the image includes the sky and the second portion of the image includes an automobile interior.

6. A method for determining whether a vehicle suspension system has degraded by positioning an electronic device in the vehicle during operation, the method comprising:
- activating a camera to initiate data capture within the electronic device;
- positioning the camera to capture a change in a field of view during vehicle operation, wherein positioning the camera includes having a first portion of an image in the field of view exhibiting a lighter background than a second portion of the image in the field of view to provide a sharp contrast between the first and second portions of the image;
- calculating a vehicle suspension operating characteristic based on information captured by the camera;
- determining whether the calculated vehicle suspension operating characteristic exceeds a threshold; and
- outputting a signal indicative of suspension degradation when the threshold is exceeded.

7. The method of claim 6, further including accessing image stabilization data generated by the microprocessor and determining a magnitude of camera displacement based on the image stabilization data.

8. The method of claim 7, wherein the image stabilization data is generated from an active image stabilization system.

9. The method of claim 6, further comprising comparing frame-by-frame images captured by the camera to determine a frequency of camera displacement and calculating the vehicle suspension operating characteristic based on the frequency of camera displacement.

10. The method of claim 6, further comprising displaying geographical route data obtained from the global positioning system which corresponds to the captured change in a field of view data.

11. The method of claim 6, wherein positioning the camera includes having the first portion of the image include the sky and the second portion of the image include an automobile interior.

* * * * *